US008389121B2

(12) United States Patent
Disteldorf et al.

(10) Patent No.: US 8,389,121 B2
(45) Date of Patent: *Mar. 5, 2013

(54) COATED ARTICLE WITH LOW-E COATING INCLUDING ZIRCONIUM OXIDE AND/OR ZIRCONIUM SILICON OXYNITRIDE AND METHODS OF MAKING SAME

(75) Inventors: Bernd Disteldorf, Mettlach (DE); Philip J. Lingle, Temperance, MI (US); Jingyu Lao, Saline, MI (US); Brent Boyce, Novi, MI (US)

(73) Assignees: Centre Luxembourgeois de Recherches pour le Verre et la Ceramique S.A. (C.R.V.C.), Luxembourg (LU); Guardian Industries Corp., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/591,271

(22) Filed: Aug. 22, 2012

(65) Prior Publication Data
US 2012/0315469 A1 Dec. 13, 2012

Related U.S. Application Data

(63) Continuation of application No. 12/213,879, filed on Jun. 25, 2008, now Pat. No. 8,263,227.

(51) Int. Cl.
*B32B 9/00* (2006.01)
*B32B 17/00* (2006.01)
(52) U.S. Cl. ......... 428/428; 428/432; 428/689; 428/702
(58) Field of Classification Search ................. None
See application file for complete search history.

(56) References Cited

U.S. PATENT DOCUMENTS

| 5,201,926 | A | 4/1993 | Szczyrbowski et al. |
| 5,584,902 | A | 12/1996 | Hartig et al. |
| 6,475,626 | B1 | 11/2002 | Stachowiak |
| 6,495,251 | B1 | 12/2002 | Arbab et al. |
| 6,605,358 | B1 | 8/2003 | Stachowiak |
| 7,081,301 | B2 | 7/2006 | Stachowiak |
| 7,147,924 | B2 | 12/2006 | Stachowiak |
| 7,153,578 | B2 | 12/2006 | Chonlamaitri et al. |
| 8,263,227 | B2 | 9/2012 | Disteldorf et al. |
| 2004/0197574 | A1 | 10/2004 | Stachowiak |
| 2005/0202255 | A1 | 9/2005 | Lemmer et al. |
| 2006/0046073 | A1 | 3/2006 | Neuman et al. |

(Continued)

FOREIGN PATENT DOCUMENTS
EP          1 736 454          12/2006
(Continued)

OTHER PUBLICATIONS

U.S. Appl. No. 12/213,879, filed Jun. 25, 2008; Disteldorf et al.

*Primary Examiner* — Scott B Geyer
(74) *Attorney, Agent, or Firm* — Nixon & Vanderhye P.C.

(57) ABSTRACT

This application relates to a coated article including at least one infrared (IR) reflecting layer of a material such as silver or the like in a low-E coating. In certain embodiments, at least one layer of the coating is of or includes zirconium oxide (e.g., $ZrO_2$) or zirconium silicon oxynitride (e.g., $ZrSiO_xN_y$). When a layer comprising zirconium oxide or zirconium silicon oxynitride is provided as the uppermost or overcoat layer of the coated article (e.g., over a silicon nitride based layer), this results in improved chemical and heat stability in certain example embodiments. Coated articles herein may be used in the context of insulating glass (IG) window units, vehicle windows, or in other suitable applications such as monolithic window applications, laminated windows, and/or the like.

7 Claims, 2 Drawing Sheets

U.S. PATENT DOCUMENTS

| | | |
|---|---|---|
| 2006/0121290 A1 | 6/2006 | Chonlamaitri et al. |
| 2006/0159933 A1 | 7/2006 | Disteldorf et al. |
| 2007/0036986 A1 | 2/2007 | Chonlamaitri et al. |

FOREIGN PATENT DOCUMENTS

| | | |
|---|---|---|
| WO | WO 2005/021456 | 3/2005 |
| WO | WO 2006/066101 | 6/2006 |
| WO | WO 2008/060453 | 5/2008 |

COATED ARTICLE WITH LOW-E COATING INCLUDING ZIRCONIUM OXIDE AND/OR ZIRCONIUM SILICON OXYNITRIDE AND METHODS OF MAKING SAME

This application is a continuation of application Ser. No. 12/213,879 filed Jun. 25, 2008 now U.S. Pat. No. 8,263,227, the entire disclosure of which is hereby incorporated herein by reference in this application.

This application relates to a coated article including at least one infrared (IR) reflecting layer of a material such as silver or the like in a low-E coating. In certain embodiments, at least one layer of the coating is of or includes zirconium oxide (e.g., $ZrO_2$), zirconium oxynitride, or zirconium silicon oxynitride (e.g., $ZrSiO_xN_y$). In certain example embodiments, the provision of a layer comprising zirconium oxide or zirconium silicon oxynitride permits a layer to be used which has a high refractive index and ultraviolet (UV) absorption. When a layer comprising zirconium oxide or zirconium silicon oxynitride is provided as the uppermost or overcoat layer of the coated article (e.g., over a silicon nitride based layer), this results in improved chemical and heat stability in certain example embodiments. Thus, in certain example embodiments, UV absorption for example may be improved if desired. Coated articles herein may be used in the context of insulating glass (IG) window units, vehicle windows, or in other suitable applications such as monolithic window applications, laminated windows, and/or the like.

BACKGROUND AND SUMMARY OF EXAMPLE EMBODIMENTS OF THE INVENTION

Coated articles are known in the art for use in window applications such as insulating glass (IG) window units, vehicle windows, monolithic windows, and/or the like. In certain example instances, designers of coated articles often strive for a combination of high visible transmission, low emissivity (or low emittance), and/or low sheet resistance ($R_s$). High visible transmission may permit coated articles to be used in applications where these characteristics are desired such as in architectural or vehicle window applications, whereas low-emissivity (low-E), and low sheet resistance characteristics permit such coated articles to block significant amounts of IR radiation so as to reduce for example undesirable heating of vehicle or building interiors. Thus, typically, for coatings used on architectural glass to block significant amounts of IR radiation, high transmission in the visible spectrum is often desired. However, low transmittance and/or high reflectance in the IR and/or near IR part(s) of the spectrum is also desired to reduce for example undesirable heating of vehicle or building interiors.

Unfortunately, low-E coatings often do not block significant amounts of ultraviolet (UV) radiation. In other words, low-E coatings typically provide only moderate or negligible UV protection, since the materials used in the layer stacks are transparent for short wavelengths (e.g., below 400 nm). In particular, materials used in such layer stacks such as tin oxide and titanium oxide cannot provide adequate UV protection given the small thicknesses of such materials required for low-E coatings. Thus, even with such coatings are provided on windows such as IG windows or vehicle windows, significant amounts of UV radiation makes its way through the window and into the building or vehicle. UV radiation tends to damage furniture and other elements inside of buildings or vehicles.

Materials such as vanadium oxide and cerium oxide absorb significant amounts of UV radiation. However, while such materials are characterized by a very steep onset of absorption for UV radiation, the onset of radiation absorption occurs in significant part in the visible part of the spectrum thereby leading to a significant distortion of colors when look through such a coating (e.g., a yellow shift). Accordingly, viewing characteristics tend to be degraded when layers of such materials are used.

There also exists a need in the art for improved chemical stability (chemical durability) and heat stability (stability upon heat treatment such as thermal tempering).

In view of the above, it will be appreciated that there exists a need in the art for a coated article including a low-E coating which is capable of blocking at some UV radiation in an efficient manner. Certain example embodiments of this invention relate to a coated article which permits significant UV absorption properties to be achieved.

In certain example embodiments of this invention, it has surprisingly been found that the provision of a layer consisting essentially of, or comprising, zirconium oxide (e.g., $ZrO_2$), zirconium oxynitride, or zirconium silicon oxynitride (e.g., $ZrSiO_xN_y$) unexpectedly improves blocking (reflecting and/or absorption) of UV radiation in a manner which does not significantly degrade other optical properties of a coated article such as visible transmission and/or color. Surprisingly, when a layer comprising zirconium oxide or zirconium silicon oxynitride is provided as the uppermost or overcoat layer of the coated article (e.g., over a silicon nitride based layer), this results in improved chemical and heat stability in certain example embodiments.

In certain example embodiments of this invention, a layer of zirconium oxide or zirconium silicon oxynitride may be tuned in a manner so as to achieve a desired amount of UV blocking and/or absorption, as well as improved durability. It has been found that zirconium oxide or zirconium silicon oxynitride has optical constants (n and k) which allow adjustment of the onset of absorption by varying oxygen content of the layer for example. Moreover, it has been found that zirconium oxide, zirconium oxynitride, or zirconium silicon oxynitride has a refractive index (n) in a range which is very adaptable to low-E coatings, so that such layer(s) may be used in low-E coatings without significantly changing the visible appearance of the coated article or certain performance data. Thus, in certain example embodiments of this invention, the absorption edge of the curve defined by a layer of zirconium oxide or zirconium silicon oxynitride can be adjusted by changing the oxygen content thereof, which may be done for example by adjusting the amount of oxygen introduced into the sputtering chamber(s) during reactive sputter-deposition of the layer. In particular, for example, as oxygen content of the layer increases, the absorption edge of the curve defined by the layer of zirconium oxide or zirconium silicon oxynitride moves toward lower wavelengths away from certain visible wavelengths. Thus, in certain example embodiments, a balancing or tuning can be performed so as to achieve a desired balance between visible transmission and UV absorption.

In certain example embodiments of this invention, there is provided a coated article including a coating supported by a glass substrate, the coating comprising, in this order from the glass substrate outwardly: a first dielectric layer; a first contact layer; an infrared (IR) reflecting layer comprising silver located on the substrate over at least and contacting the first contact layer; a second contact layer comprising Ni and/or Cr located over and contacting the IR reflecting layer; a second dielectric layer comprising silicon nitride located over the second contact layer; and an overcoat dielectric layer comprises one or more of zirconium oxide, zirconium oxynitride, and/or zirconium silicon oxynitride located over and contacting the second dielectric layer comprising silicon nitride.

DETAILED DESCRIPTION OF EXAMPLE EMBODIMENTS OF THE INVENTION

Figure 1:
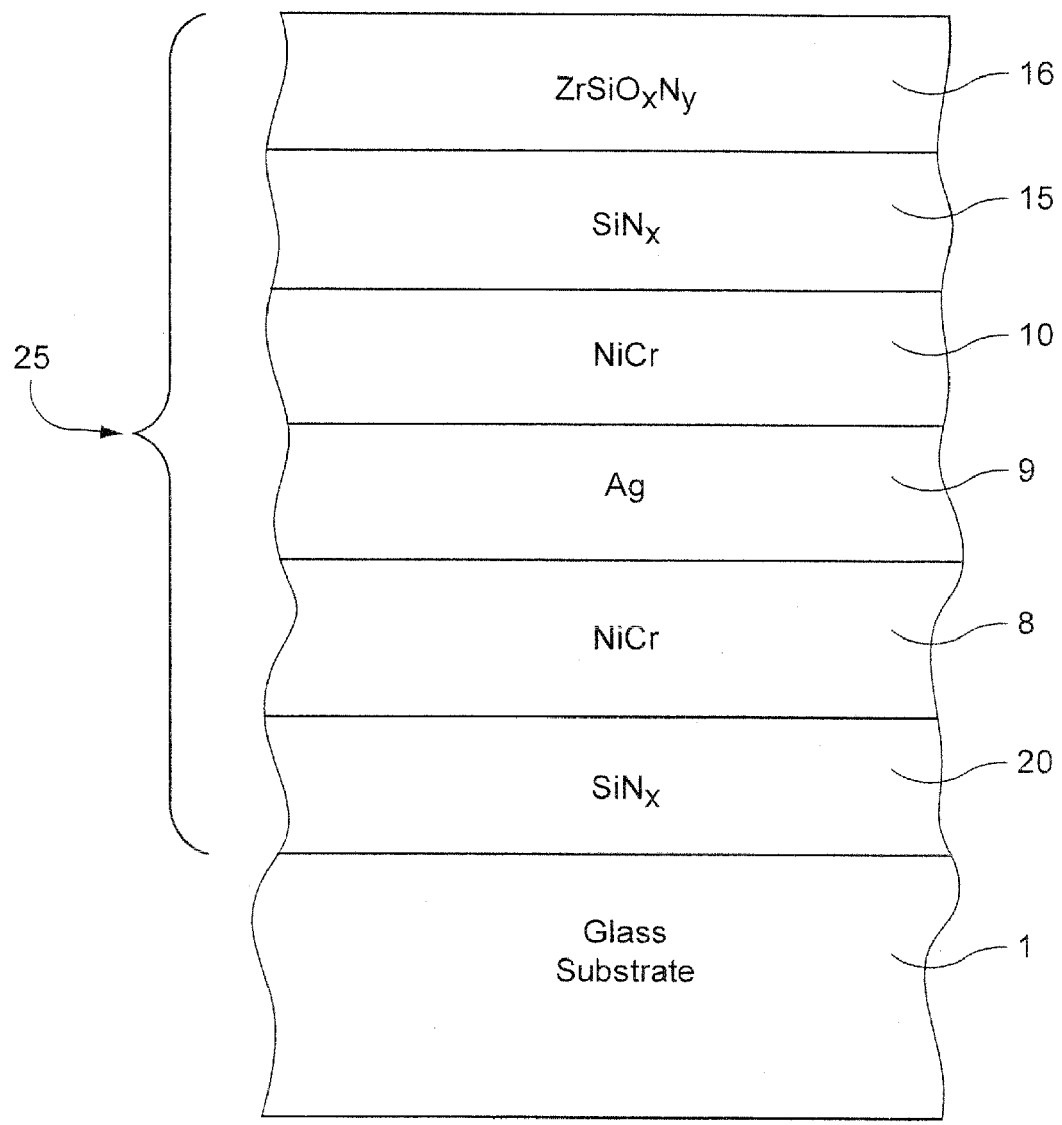
FIG. 1 is a cross sectional view of a coated article according to an example embodiment of this invention.

Referring now to the drawings in which like reference numerals indicate like parts throughout the several views.

Coated articles herein may be used in coated article applications such as monolithic windows, IG window units, vehicle windows, and/or any other suitable application that includes single or multiple substrates such as glass substrates.

Certain embodiments of this invention relate to a coated article which includes at least one glass substrate supporting a coating. The coating typically has at least one infrared (IR) reflecting layer which reflects and/or blocks at least some IR radiation. The IR reflecting layer(s) may be of a material such as silver, gold, NiCr or the like in different embodiments of this invention. Often, an IR reflecting layer is sandwiched between at least first and second dielectric layers of the coating. In certain example embodiments of this invention, it has surprisingly been found that the provision of a layer 16 consisting essentially of, or comprising, zirconium oxide or zirconium silicon oxynitride (e.g., $ZrSiO_xN_y$) as a dielectric layer(s) of such a coating unexpectedly improves blocking (reflecting and/or absorption) of UV radiation in a manner which does not significantly degrade other optical properties of a coated article such as visible transmission and/or color. One or more such zirconium oxide or zirconium silicon oxynitride layers may be provided in a given coating in different embodiments of this invention. Moreover, such zirconium oxide or zirconium silicon oxynitride layer(s) may be provided in any type of solar control or low-E (low-emissivity, or low-emittance) coating in different embodiments of this invention (e.g., as an overcoat), and the specific low-E coatings described herein are for purposes of example only unless recited in the claim(s). When a layer comprising zirconium oxide or zirconium silicon oxynitride is provided as the uppermost or overcoat layer of the coated article (e.g., over a silicon nitride based layer), this results in improved chemical and heat stability in certain example embodiments. The use of a layer of zirconium oxide or zirconium silicon oxynitride in this respect (e.g., as an overcoat layer) has surprisingly been found to improve chemical stability and heat stability, and has also been found to be stable during sputtering processing.

In certain example embodiments of this invention, the oxygen content of the zirconium oxynitride or zirconium silicon oxynitride layer(s) 16 (e.g., see FIG. 1) is adjusted so that the zirconium silicon oxynitride inclusive layer has an index of refraction (n) (at a wavelength of 550 nm) of from about 1.6 to 2.8, more preferably from about 1.7 to 2.5, and even more preferably from about 1.8 to 2.4. Moreover, the oxygen content of the zirconium silicon oxynitride layer(s) 16 is adjusted so that the zirconium silicon oxynitride inclusive layer has an extinction coefficient (k) (at a wavelength of 550 nm) of no greater than about 2.3, more preferably no greater than about 2.0, even more preferably no greater than about 1.8. Tuning of the oxygen content of the zirconium silicon oxynitride 16 in such a manner has been found to permit good UV absorption to be achieved in combination with not significantly adversely affecting visible characteristics of the coated article. Moreover, tuning of the oxygen content in such a manner causes the zirconium silicon oxynitride to have a refractive index which is close to that of certain layers often used in low-E coatings such as oxides of Ti, Sn, Zn and/or the like. As an example, the absorption edge of a zirconium silicon oxynitride layer 16 can be moved over a large wavelength range and may be positioned above, below, or substantially on a ZnO reference edge merely by changing the oxidation level of the layer thereby permitting it to substantially match ZnO from an optical perspective in certain example instances. Thus, such zirconium silicon oxynitride may replace part of all of such layers in low-E coatings in certain situations without significantly adversely affecting visible characteristics of the coated article. The achievable UV protection is largely dependent on the position of the absorption edge and the layer thickness required by the optical properties of the overall coating.

Moreover, in forming the zirconium silicon oxynitride layer(s) 16 according to certain example embodiments of this invention (e.g., via reactive sputtering), the ratio of nitrogen/oxygen (e.g., $N_2/O_2$) gas used in the sputter chamber is no greater than about 25, more preferably no greater than about 18, more preferably no greater than about 10. In certain example embodiments of this invention, the ratio of nitrogen/oxygen (e.g., $N_2/O_2$) gas used in the sputter chamber in forming a layer 16 of or including zirconium silicon oxynitride is from about 1 to 25, more preferably from about 2 to 18, and sometimes from about 2 to 10. Additionally, according to certain example embodiments of this invention, a zirconium silicon oxynitride layer 16 is characterized by a ratio of nitrogen to oxygen (atomic percent) therein of from about 1 to 25, more preferably from about 2 to 18, and sometimes from about 2 to 10. Of course, other gases such as Ar may also be used in the sputtering chamber along with oxygen and nitrogen when sputter depositing a layer of zirconium silicon oxynitride. In certain example embodiments, the amount of Ar gas used in sputtering is greater than the amount of oxygen but less than the amount of nitrogen used in forming a layer of zirconium oxynitride or zirconium silicon oxynitride 16. For example, in certain example embodiments, the gas ratio used in sputter depositing a layer of zirconium silicon oxynitride is 40 ml Ar, 55 ml $N_2$ and 10 ml $O_2$.

Moreover, in certain example embodiments of this invention, the peak of the refractive index curve (e.g., see FIG. 4) for a layer of zirconium oxide or zirconium silicon oxynitride is at a wavelength shorter than about 400 nm, more preferably shorter than about 375 nm, and sometimes shorter than about 350 nm, and even sometimes shorter than about 300 nm. In addition to the aforesaid advantageous optical properties, zirconium oxide or zirconium silicon oxynitride layers according to different embodiments of this invention realize good mechanical and chemical durability. Thus, such layers may be suitable for use in base coats or overcoats in solar control and/or low-E coatings for example.

In certain example embodiments of this invention, the Zr/Si ratio (atomic percent) in an example zirconium oxynitride or zirconium silicon oxynitride layer may be from about 0.25 to 5.0, more preferably from about 0.5 to 4, even more preferably from about 0.75 to 3.0, and still more preferably from about 1.0 to 2.0, and most preferably from about 1.25 to 1.75. Thus, in certain example embodiments of this invention there is more Zr than Si in a layer of or including zirconium silicon oxynitride in terms of atomic percent. Moreover, in certain example embodiments, an example zirconium silicon oxynitride layer may be from about 20 to 400 Å thick, more preferably from about 40 to 300 Å thick, and even more preferably from about 50 to 250 Å thick. In certain example embodiments, the layer 16 of or including zirconium silicon oxynitride may be of or include from about 20-45% (more preferably 25-40%, most preferably from about 30-36%, or 33%) Si, from about 40-65% (more preferably 45-63%, most preferably from about 50-59%, or 54%) Zr, with the rest being made up of optional dopant such as Al and/or $Y_2O_3$. An example is about 60% Zr and about 40% Si, in layer 16 in the FIG. 1 embodiment. In certain example embodiments, the layer 16 (in either the FIG. 1 or FIG. 2 embodiment) includes from about 2-8% (more preferably from about 3-7%, or about 5%) Al, and from about 2-12% (more preferably from about 4-10%, or about 6-8%) $Y_2O_3$. It is noted that in the FIG. 1 embodiment, the layer 16 may instead be of zirconium nitride, zirconium oxide, or zirconium oxynitride.

As explained above, zirconium oxide or zirconium silicon oxynitride layers according to different example embodiments of this invention may be used in various locations in solar control coatings. The coatings described below are provided for purposes of example.

Figure 2:
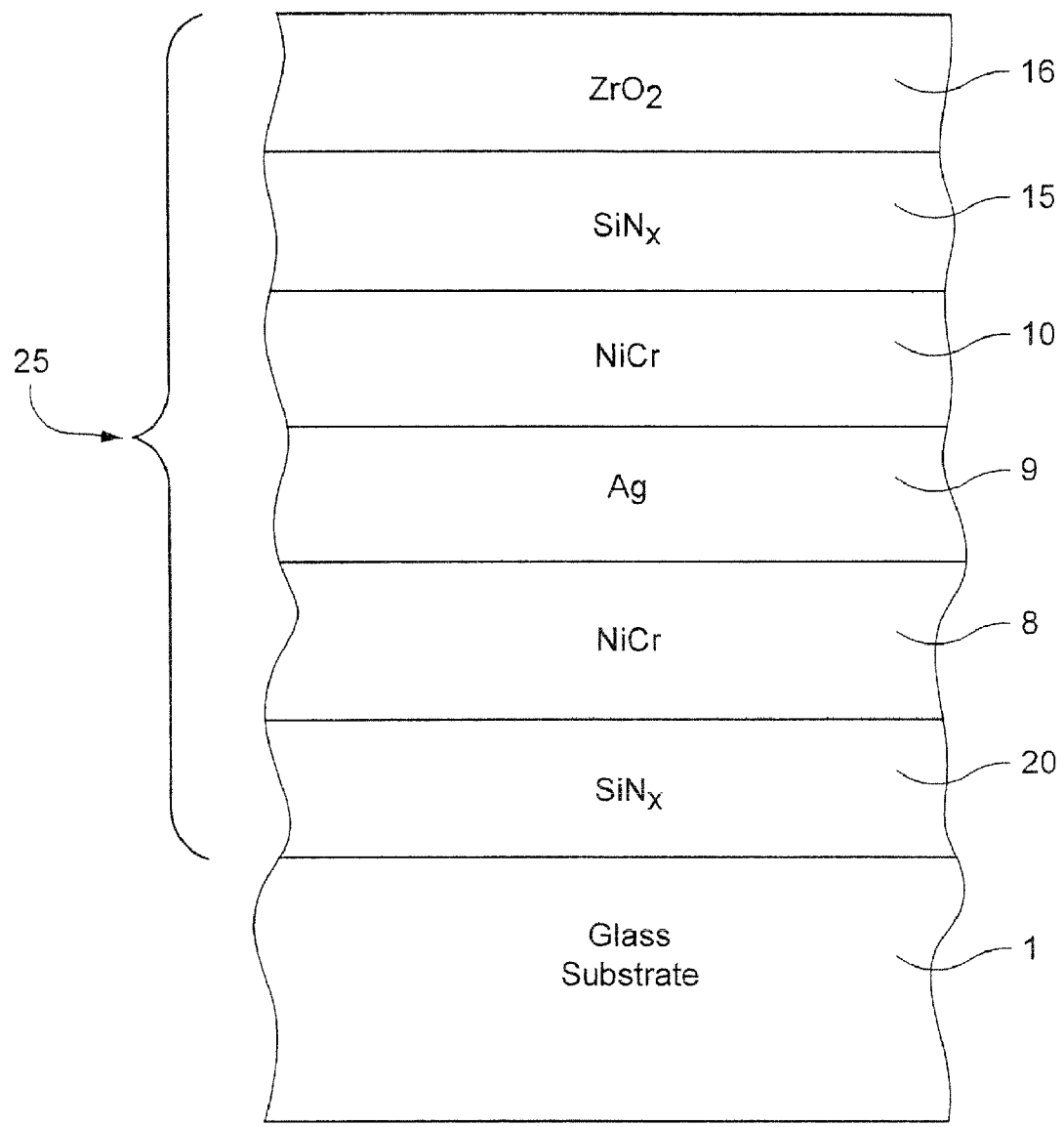
FIG. 2 is a cross sectional view of a coated article according to another example embodiment of this invention.

FIGS. 1-2 are cross sectional view of a coated article according to an example embodiment of this invention. The coated article includes glass substrate 1 (e.g., clear, green, bronze, or blue-green glass substrate from about 1.0 to 10.0 mm thick, more preferably from about 1.0 mm to 6.0 mm thick), and a multi-layer coating (or layer system) provided on the substrate either directly or indirectly. As shown in FIG. 1, the coating 25 comprises dielectric layer 20, contact layer 8 of or including NiCr or an oxide of nickel chrome (e.g., NiCr or $NiCrO_x$), IR reflecting layer 9 including or of silver, gold, or the like, upper contact layer 10 of or including NiCr or an oxide of nickel chrome (e.g., NiCr or $NiCrO_x$), dielectric layer 15 (e.g., of or including silicon nitride), and dielectric layer 16 of or including a material such as zirconium oxide, zirconium oxynitride, or zirconium silicon oxynitride which may in certain example instances be a protective overcoat. Certain characteristics of the layer 16 are discussed above when the layer 16 is of or including zirconium silicon oxynitride. The zirconium oxide, zirconium oxynitride, or zirconium silicon oxynitride layer 16 may be doped (e.g., with Al or the like) in certain example embodiments of this invention. Other layers and/or materials may also be provided in certain example embodiments of this invention, and it is also possible that certain layers may be removed or split in certain example instances.

Infrared (IR) reflecting layer 9 is preferably substantially or entirely metallic and/or conductive, and may comprise or consist essentially of silver (Ag), gold, or any other suitable IR reflecting material. IR reflecting layer 9 helps allow the coating to have low-E and/or good solar control characteristics such as low emittance, low sheet resistance, and so forth. The IR reflecting layer 9 may, however, be slightly oxidized in certain embodiments of this invention.

The upper and lower contact layers 8 and 10 may be of or include an oxide of Ni and/or Cr. In certain example embodiments, upper and lower contact layers 8, 10 may be of or include nickel (Ni), chromium/chrome (Cr), a nickel alloy such as nickel chrome (NiCr), Haynes alloy, an oxide of any of these, or other suitable material(s). For example, one of these layers may be of or include zinc oxide instead of NiCr. The use of, for example, NiCr in these layers allows durability to be improved in certain example instances, and the provided thicknesses permit low $\Delta E^*$ values to be achieved. Contact layers 8 and 10 (e.g., of or including Ni and/or Cr) may or may not be continuous in different embodiments of this invention across the entire IR reflecting layer. In certain example embodiments, one or both of the NiCr layers 8, 10 includes from about 70-81% Ni, from about 15-19% Cr, from about 3-6% Al, and possibly from about 0-4% (or 1-4%) Fe. An example is 76.5% Ni, 17% Cr, 4.3% Al, and optionally about 2.2% Fe, for one or both of layers 8, 10.

Dielectric layers 15 and 20 may be of or include silicon nitride (e.g., $Si_3N_4$) or any other suitable material in certain example embodiments of this invention such as silicon oxynitride. These layers are provided for durability purposes, and to protect the underlying layers, and also for antireflective purposes. In certain example embodiments, layers 15 and 20 each may have an index of refraction (n) of from about 1.9 to 2.2, more preferably from about 1.95 to 2.05.

It has been found that the provision of an overcoat layer 16 of or including zirconium oxide (e.g., see FIG. 2) can reduce and/or eliminate thermal stability problems. In particular, in certain example embodiments of this invention, the use of a zirconium oxide inclusive overcoat layer 16 in combination with the silicon nitride based layer 15 and contact layer 10 can result in a coated article which can be significantly heat treated (e.g., thermally tempered) without suffering from significant mottling damage or other damage from heat treatment (e.g., the coated article can realize acceptable visible transmission, a* and/or b* values following heat treatment such as thermal tempering). In certain example embodiments, the index "n" of the zirconium oxide layer 16 is from about 2.1 to 2.25, more preferably about 2.16 (at 550 nm).

It has been found that by using zirconium oxide or zirconium silicon oxynitride as a top or overcoat layer 16 with silicon nitride 15 underneath the same as shown in FIGS. 1-2, the coated article realizes a higher light transmission and a significant drop in sheet resistance—both of which are unexpected improvements/results. Unexpected UV advantages are also realized as discussed above, due to the use of zirconium oxide or zirconium silicon oxynitride. This embodiment may be heat treated (thermally tempered with the coating thereon) in certain example embodiments of this invention.

Other layer(s) below or above the illustrated coating 25 may also be provided. Thus, while the layer system or coating is "on" or "supported by" substrate 1 (directly or indirectly), other layer(s) may be provided therebetween. Thus, for example, the coating of FIG. 1 may be considered "on" and "supported by" the substrate 1 even if other layer(s) are provided between layer 3 and substrate 1. Moreover, certain layers of the illustrated coating may be removed in certain embodiments, while others may be added between the various layers or the various layer(s) may be split with other layer(s) added between the split sections in other embodiments of this invention without departing from the overall spirit of certain embodiments of this invention.

The value(s) $\Delta E^*$ is important in determining whether or not there is thermal stability, matchability, or substantial color matchability upon HT, in the context of certain embodiments of this invention (i.e., the term $\Delta E^*$ is important in determining color stability upon HT). Color herein is described by reference to the conventional a*, b* values. For example, the term $\Delta a^*$ is indicative of how much color value a* changes due to HT. The term $\Delta E^*$ (and $\Delta E$) is well understood in the art. The definition of the term $\Delta E^*$ may be found, for example, in WO 02/090281 and/or U.S. Pat. No. 6,475,626, the disclosures of which are hereby incorporated herein by reference. In particular, $\Delta E^*$ corresponds to the CIE LAB Scale L*, a*, b*, and is represented by:

$$\Delta E^* = \{(\Delta L^*)^2 + (\Delta a^*)^2 + (\Delta b^*)^2\}^{1/2} \tag{1}$$

where:

$$\Delta L^* = L^*_1 - L^*_o \quad (2)$$

$$\Delta a^* = a^*_1 - a^*_o \quad (3)$$

$$\Delta b^* = b^*_1 - b^*_o \quad (4)$$

Above, the subscript "o" represents the coating (or coated article) before heat treatment and the subscript "1" represents the coating (or coated article) after heat treatment; and the numbers employed (e.g., $a^*$, $b^*$, $L^*$) are those calculated by the aforesaid (CIE LAB 1976) $L^*$, $a^*$, $b^*$ coordinate technique. In a similar manner, $\Delta E$ may be calculated using equation (1) by replacing $a^*$, $b^*$, $L^*$ with Hunter Lab values ah, bh, Lh. Also within the scope of this invention and the quantification of $\Delta E^*$ are the equivalent numbers if converted to those calculated by any other technique employing the same concept of $\Delta E^*$ as defined above.

It has been found that thinning the NiCr layers 8 and 10 results in good (lower) $\Delta E^*$ values compared to a situation where layers 8, 10 are not thinned. In certain example embodiments, the upper NiCr based layer 10 is thinner than the lower NiCr based layer 8. In certain example embodiments of this invention, NiCr based layers 8, 10 are thinned and the resulting coated article due to heat treatment has a $\Delta E^*$ value (glass side reflective) of no more than 3.0, more preferably no more than 2.5, even more preferably no more than 2.0 and possibly no more than 1.5.

While various thicknesses may be used in different embodiments of this invention, example thicknesses and materials for the respective layers on the glass substrate 1 in the FIGS. 1-2 embodiments are as follows, from the glass substrate outwardly:

TABLE 1

(Example Materials/Thicknesses)

| Layer | Range (Å) | More Preferred (Å) | Example (Å) |
|---|---|---|---|
| Si₃N₄ (layer 20) | 150-700 Å | 200-600 Å | 380 Å |
| NiCr (layer 8) | <=12 Å | <=10 Å | 7-8 Å |
| Ag (layer 9) | 30-170 Å | 40-110 Å | 67 Å |
| NiCr (layer 10) | <=11 Å | <=9 Å | 6-8 Å |
| Si₃N₄ (layer 15) | 150-700 Å | 200-600 Å | 365 Å |
| ZrO₂ or ZrSiO$_x$N$_y$ (layer 16) | 40-400 Å | 100-200 Å | 150 Å |

In certain example embodiments of this invention, coated articles herein may have the following low-E (low emissivity), solar and/or optical characteristics set forth in Table 2 when measured monolithically.

TABLE 2

Low-E/Solar Characteristics (Monolithic)

| Characteristic | General | More Preferred | Most Preferred |
|---|---|---|---|
| $R_s$ (ohms/sq.): | <=20.0 | <=15.0 | <=10.0 |
| $T_{vis}$ (%): | >=50 | >=60 | >=70 or 75 |

Moreover, coated articles including coatings according to certain example embodiments of this invention have the following optical characteristics (e.g., when the coating(s) is provided on a clear soda lime silica glass substrate 1 from 1 to 10 mm thick, preferably about 4 mm thick). In Table 3, all parameters are measured monolithically (before and/or after heat treatment).

TABLE 3

Example Optical Characteristics (Monolithic)

| Characteristic | General | More Preferred |
|---|---|---|
| $T_{vis}$ (or TY)(Ill. C, 2 deg.): | >=60% | >=70% or 75% |
| $a^*_t$ (Ill. C, 2°): | −6 to +6 | −3 to 0 |
| $b^*_t$ (Ill. C, 2°): | −10 to +10.0 | −4 to 0 |
| $L^*_t$: | >=89 | >=90 |
| $R_fY$ (Ill. C, 2 deg.): | <=10% | <=6% |
| $a^*_f$ (Ill. C, 2°): | −5 to +5 | −3 to +2 |
| $b^*_f$ (Ill. C, 2°): | −14.0 to +10.0 | −10.0 to +5 |
| $L^*_f$: | 22-30 | 24-27 |
| $R_gY$ (Ill. C, 2 deg.): | <=11% | <=7% |
| $a^*_g$ (Ill. C, 2°): | −7 to +7 | −2 to +7 |
| $b^*_g$ (Ill. C, 2°): | −10.0 to +10.0 | −2.0 to +7 |
| $L^*_g$: | 23-38 | 25-37 |

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A coated article including a coating supported by a glass substrate, the coating comprising from the glass substrate outwardly:
   a first dielectric layer comprising silicon nitride;
   a first contact layer;
   an infrared (IR) reflecting layer comprising silver located on the substrate over at least and contacting the first contact layer;
   a second contact layer located over and contacting the IR reflecting layer, the second contact layer having a thickness of less than or equal to 11 angstroms;
   a second dielectric layer comprising silicon nitride located over and contacting the second contact layer; and
   an overcoat dielectric layer comprising one or more of zirconium oxynitride and zirconium silicon oxynitride located over and contacting the second dielectric layer comprising silicon nitride, and wherein the overcoat dielectric layer is doped with Y.

2. The coated article of claim 1, wherein the first dielectric layer comprising silicon nitride is in direct contact with the glass substrate.

3. The coated article of claim 1, wherein the overcoat layer comprises zirconium silicon oxynitride.

4. The coated article of claim 1, wherein the coated article has a sheet resistance ($R_s$) of no greater than about 15 ohms/square and a visible transmission of at least about 70%.

5. The coated article of claim 1, wherein the overcoat layer comprises zirconium oxynitride.

6. The coated article of claim 1, wherein the first contact layer comprises Ni and Cr, and has a thickness of 7-8 angstroms.

7. The coated article of claim 1, wherein the overcoat layer is doped with from about 2-12% $Y_2O_3$.

* * * * *